(12) United States Patent
Da Silva

(10) Patent No.: US 8,842,771 B2
(45) Date of Patent: Sep. 23, 2014

(54) AMPLITUDE FLATNESS AND PHASE LINEARITY CALIBRATION FOR RF SOURCES

(71) Applicant: Tektronix, Inc., Beaverton, OR (US)

(72) Inventor: Marcus K. Da Silva, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 13/682,411

(22) Filed: Nov. 20, 2012

(65) Prior Publication Data

US 2014/0140436 A1 May 22, 2014

(51) Int. Cl.
*H04K 1/02* (2006.01)
*H04B 1/04* (2006.01)

(52) U.S. Cl.
CPC ............................... *H04B 1/0475* (2013.01)
USPC .......................................................... 375/296

(58) Field of Classification Search
CPC .. H04B 10/504; H04B 10/25137; H04B 1/62; H04B 10/50572; H04B 1/0475; H04L 27/368; H04L 25/03343; H04L 27/367; H03F 1/3247; H03F 2201/3233; H03F 1/3241; H03F 2201/3227
USPC .................................................. 375/296, 297
See application file for complete search history.

(56) References Cited

U.S. PATENT DOCUMENTS

| | | | |
|---|---|---|---|
| RE37,407 E * | 10/2001 | Eisenberg et al. | 330/2 |
| 2003/0095607 A1* | 5/2003 | Huang et al. | 375/296 |
| 2004/0193965 A1* | 9/2004 | Coersmeier | 714/48 |
| 2010/0048146 A1* | 2/2010 | McCallister | 455/78 |
| 2012/0002752 A1* | 1/2012 | Coan et al. | 375/297 |
| 2012/0195352 A1* | 8/2012 | Chiron | 375/219 |
| 2012/0300878 A1* | 11/2012 | Cai et al. | 375/296 |
| 2013/0003889 A1* | 1/2013 | Earls | 375/296 |

OTHER PUBLICATIONS

Vasudev, N., "Measurement of a Filter Using a Power Detector", IEEE Transactions on Microwave Theory and Techniques, IEEE Service Center, vol. 50, No. 9, pp. 2083-2089, Sep. 1, 2002, XP011076698.

He, Y., "New Amplitude Correction and Phase Linearization Technique for Channel Response on Wideband Microwave Spectrum Analysers", Microwave Conference, Oct. 27, 2008, pp. 1161-1164, XP031407372.

European Search Report and Written Opinion for Application No. 13193603.1, dated Mar. 6, 2014, 7 pages.

* cited by examiner

*Primary Examiner* — Don N Vo
(74) *Attorney, Agent, or Firm* — Francis I. Gray; Marger, Johnson & McCollom, P.C.

(57) ABSTRACT

An amplitude flatness and phase linearity calibration method for an RF source across a wide frequency bandwidth uses a simple square law diode detector and at least a pair of equal amplitude frequency tones. A baseband generator for the RF source generates the tones, which are applied in series to a correction filter and an up-converter to produce an output RF signal. The tones are stepped across a specified frequency bandwidth, and at each average frequency for the tones a magnitude and group delay is measured as well as a phase for the beat frequency between the tones. The resulting measurements are used to calibrate filter coefficients for the correction filter to assure amplitude flatness and phase linearity across the specified frequency bandwidth.

6 Claims, 2 Drawing Sheets

AMPLITUDE FLATNESS AND PHASE LINEARITY CALIBRATION FOR RF SOURCES

BACKGROUND OF THE INVENTION

The present invention relates to signal sources for testing electronic equipment, and more particularly to amplitude flatness and phase linearity calibration for radio frequency (RF) signal sources.

A vector signal generator may be constructed using an arbitrary waveform generator (AWG) capable of wideband signal generation followed by one or more stages of block up-conversion and filtering. The up-conversion and filtering process may create significant amounts of amplitude ripple and deviation from linear phase across the frequency bandwidth of interest for the desired wideband test signal. These phase and magnitude effects are due to both the action of the filters and of the mixers themselves.

The frequency response of the up-conversion process may be corrected by applying a baseband correction filter having a response which, when cascaded with the up-converter, provides a flat amplitude and linear phase over the frequency bandwidth of interest. It is necessary to measure the frequency response characteristics of the up-converter in order to create the baseband correction filter. This measurement typically is done with external test equipment in a factory environment. However such measurement is inherently limited because the frequency response is subject to changes with temperature and age of components.

One method for measuring magnitude and phase of an instrument or transmission system using a power detector is described by Vasudev et al in IEEE Transactions on Microwave Theory and Techniques, Vol. 50, No. 9, September 2002, entitled "Measurement of a Filter Using a Power Detector." This method describes measuring the phase at each end frequency which encompasses the frequency bandwidth of interest, and then measuring the phase at the midpoint between the two frequencies, then at the midpoint of two frequencies for which phase has already been measured, etc., until sufficient points have been measured to provide sufficient detail to describe the phase characteristics of the filter being measured across the frequency bandwidth, i.e., a "web algorithm." Measurements are made at each frequency independently to obtain known phases at each frequency.

U.S. Pat. No. 8,224,269, issued Jul. 17, 2012 to Jungerman et al entitled "Vector Modulator Calibration System", also uses a power sensor, such as a diode detector, to measure the power output from a vector modulator, i.e., the I and Q components of a vector signal which represents a single frequency signal with two components that are ninety degrees phase different.

What is desired is a means for measuring the phase and amplitude response of the RF signal source at the time of use in order to provide filter coefficients which are used to compensate for amplitude ripples and phase variations.

BRIEF DESCRIPTION OF THE INVENTION

Accordingly the present invention provides amplitude flatness and phase linearity calibration for an RF signal source by using a simple square law diode detector and at least a pair of tones from the RF signal source. A baseband generator for the RF source generates the desired tones, which are applied in series to a correction filter and an up-converter to produce an output RF signal. The tones are stepped across a specified frequency bandwidth, and at each average frequency for the tones a magnitude and group delay for the tones is measured as well as a phase for the beat frequency, or frequencies, between the tones. The resulting measurements are used to calibrate filter coefficients for the correction filter to assure amplitude flatness and phase linearity across the specified frequency bandwidth for the output RF signal.

The objects, advantages and other novel features of the present invention are apparent from the following detailed description when read in conjunction with the appended claims and attached drawing figures.

DETAILED DESCRIPTION OF THE INVENTION

Figure 1:
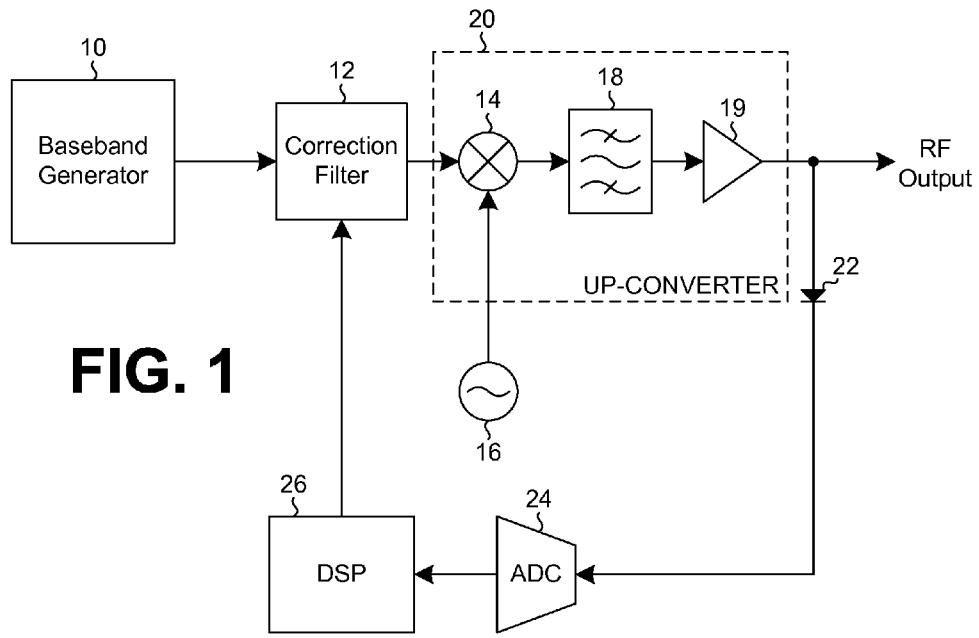
FIG. 1 is a block diagram view of an RF wideband signal source having a simple square law detector for calibrating amplitude flatness and phase linearity according to the present invention.

Referring now to FIG. 1, a baseband signal generator, such as an arbitrary waveform generator (AWG) 10, provides, as an output, at least a pair of tones that may be tuned across a frequency band of interest. Other architectures may include direct arbitrary waveform generation, up-conversion using an IQ modulator, IF up-conversion, etc. For the purposes of the following discussion, the two-tone implementation is described in detail.

The pair of tones from the baseband signal generator 10 is input to a magnitude and phase correction filter 12, such as a finite impulse response (FIR) filter, with the output of the filter being input to an up-converter stage 20. The up-converter stage 20 includes a mixer 14 which mixes the pair of tones with a frequency from a local oscillator 16. The output from the mixer 14 is input to an image rejection filter 18, the output of which is input to an output amplifier 19. The output from the output amplifier 19 is the desired RF output signal.

Also coupled to the output of the output amplifier 19 is a simple, calibrated diode 22 acting as a square law diode detector. The output from the diode 22 is input to an analog-to-digital converter (ADC) 24 to provide digitized samples. The digitized samples are then input to a digital signal processor (DSP) 26 which computes the desired filter coefficients for the correction filter 12 to provide amplitude flatness and phase linearity for the RF output signal.

The equation that describes the output from the baseband generator 10 for the pair of tones is:

$$V_{BB} = M(\cos \omega_{m1} t + \cos \omega_{m2} t), \text{ where } \omega_{m1} = \omega_m - \Delta\omega \text{ and } \omega_{m2} = \omega_m + \Delta\omega.$$

The rejection filter 18 in the up-converter stage 20 removes the difference frequencies, keeping the sum frequencies. In general, there is a frequency response caused by any baseband filtering, as well as an RF response caused by the mixer 14 and image rejection filter 18. The RF output may be represented as:

$$V_{out} = M\{[G_{BB}(\omega_{m1})B_{UC}(\omega_{m1},\omega_c)]\cos(\omega_c+\omega_{m1})t + [G_{BB}(\omega_{m2})G_{UC}(\omega_{m2},\omega_c)]\cos(\omega_c+\omega_{m2})t\}$$

where $G_{BB}(\omega_m)$ represents the baseband response of the baseband generator 10 prior to the mixer 14, and $G_{UC}(\omega_m,\omega_c)$ represents the response of the RF components, including the mixer 14. The two variables in the expression $G_{UC}(\omega_m,\omega_c)$ indicate that the frequency response is a function of both the center frequency, $\omega_c$, and the offset from the center frequency, $\omega_m$.

The square-law diode detector 22 connected to the RF output produces:

$$V_{Det}(\omega_m, \omega_c) = K_{Det} M^2$$

$$\{[G_{BB}(\omega_{m1})G_{UC}(\omega_{m1}, \omega_c)]\cos(\omega_c + \omega_{m1})t + [G_{BB}(\omega_{m2})G_{uc}(\omega_{m2}, \omega_c)]\cos(\omega_c + \omega_{m2})t\}^2$$

$$V_{Det}(\omega_m, \omega_c) = K_{Det} M^2 \Big\{ [G_{BB}(\omega_{m1})G_{UC}(\omega_{m1}, \omega_c)]^2 \Big[\frac{1}{2} + \frac{1}{2}\cos(2\omega_c + 2\omega_{m1})t\Big] +$$

$$[G_{BB}(\omega_{m2})G_{UC}(\omega_{m2}, \omega_c)]^2 \Big[\frac{1}{2} + \frac{1}{2}\cos(2\omega_c + 2\omega_{m2})t\Big] + G_{BB}(\omega_{m1})G_{UC}(\omega_{m1}, \omega_c)$$

$$G_{BB}(\omega_{m2})G_{UC}(\omega_{m2}, \omega_c)\frac{1}{2}(\cos(\omega_2 - \omega_{m1})t + \cos(2\omega_c + \omega_{m1} + \omega_{m2})t)\Big\}$$

Filtering out the direct current (DC) term and the $2\omega_c$ terms produces:

$$V_{Det}(\omega_m, \omega_c) = K_{Det} M^2 \{|G_{BB}(\omega_{m1})||G_{UC}(\omega_{m1}, \omega_c)|$$

$$\cos[(\omega_C + \omega_{m1})t + \varnothing_{BB}(\omega_{m1}) + \varnothing_{UC}(\omega_{m1}, \omega_c)]|G_{BB}(\omega_{m2})|$$

$$|G_{UC}(\omega_{m2}, \omega_c)|\cos[(\omega_C + \omega_{m2})t + \varnothing_{BB}(\omega_{m2}) + \varnothing_{UC}(\omega_{m2}, \omega_c)]\}$$

$$V_{Det}(\omega_m, \omega_c) = K_{Det} M^2 \{|G_{BB}(\omega_{m1})||G_{UC}(\omega_{m1}, \omega_c)|\cos(\omega_2 - \omega_{m1})t +$$

$$\varnothing_{BB}(\omega_{m1}) + \varnothing_{UC}(\omega_{m1}, \omega_c) - \varnothing_{BB}(\omega_{m2}) - \varnothing_{UC}(\omega_{m2}, \omega_c)\}$$

Since $\omega_{m2} = \omega_m + \Delta\omega$ and $\omega_{m1} = \omega_m - \Delta\omega$, the equation reduce to:

$$V_{Det}(\omega_m, \omega_c) =$$

$$K_{Det} M^2 |G_{BB}(\omega_{m1})||G_{UC}(\omega_{m1}, \omega_c)||G_{BB}(\omega_{m2})||G_{UC}(\omega_{m2}, \omega_c)|$$

$$\cos[2\Delta\omega t + \varnothing_{BB}(\omega_{m2}) - \varnothing_{BB}(\omega_{m1}) + \varnothing_{UC}(\omega_{m2}, \omega_c) - \varnothing_{UC}(\omega_{m1}, \omega_c)]$$

$\Delta\omega$ is chosen so that the magnitude and phase responses between $\omega_{m1}$ and $\omega_{m2}$ are approximated by a straight line, so then:

$$G_{BB}(\omega_{m1}) = |G_{BB}(\omega_{m1})|(\varnothing(\omega_{m1}) = [|G_{BB}(\omega_m)| - K_{BBm}\Delta\omega]e^{j(\varnothing_{BB}(\omega_m) - K^{BB\varnothing}\Delta\omega)}$$

$$G_{BB}(\omega_{m2}) = |G_{BB}(\omega_{m2})|(\varnothing(\omega_{m2}) = [|G_{BB}(\omega_m)| + K_{BBm}\Delta\omega]e^{j(\varnothing_{BB}(\omega_m) + K_{BB\varnothing}\Delta\omega)}$$

Similarly $$G_{UC}(\omega_{m1},\omega_c) = |G_{UC}(\omega_{m1},\omega_c)|(\varnothing_{UC}(\omega_{m1},\omega_c) = [|G_{UC}(\omega_m,\omega_c)| - K_{UCm}\Delta\omega]e^{j(\varnothing_{UC}(\omega_m,\omega_c) - K_{UC\varnothing}\Delta\omega)}$$

$$G_{UC}(\omega_{m2},\omega_c) = |G_{UC}(\omega_{m2},\omega_c)|(\varnothing_{UC}(\omega_{m1},\omega_c) = [|G_{UC}(\omega_m,\omega_c)| + K_{UCm}\Delta\omega]e^{j(\varnothing_{UC}(\omega_m,\omega_c) + K_{UC\varnothing}\Delta\omega)}$$

The magnitude response is obtained from:

$$|V_{Det}(\omega_m,\omega_c)| = K_{Det} M^2 |G_{BB1}(\omega_{m1})||G_{BB1}(\omega_{m2})||G_{UC}(\omega_{m1},\omega_c)||G_{UC}(\omega_{m2},\omega_c)|$$

$$|V_{Det}(\omega_m,\omega_c)| = K_{Det} M^2 [|G_{BB1}(\omega_m)|^2 - K_{BBm}^2 \Delta\omega^2][|G^{UC}(\omega_m,\omega_c)|^2 - K_{UCm}^2 \Delta\omega^2]$$

$$|V_{Det}(\omega_m,\omega_c)| = K_{Det} M^2 (|G_{BB1}(\omega_m)|^2 |G_{UC}(\omega_m,\omega_c)|^2 + K_{BBm}^2 \Delta\omega^2 K_{UCm}^2 \Delta\omega^2 - G_{BB1}(\omega_m)|^2 K_{UCm}^2 \Delta\omega^2 - |G_{UC}(\omega_m,\omega_c)|^2 K_{BBm}^2 \Delta\omega^2)$$

$$|V_{Det}(\omega_m,\omega_c)| = K_{Det} M^2 \{|G_{BB}(\omega_m)|^2 |G_{UC}(\omega_m,\omega_c)|^2 + K_{BBm}^2 K_{UCm}^2 \Delta\omega^4 - [|G_{BB}(\omega_m)|^2 K_{UCm}^2 + |G_{UC}(\omega_m,\omega_c)|^2 K_{BBm}^2]\Delta\omega^2\}$$

The amplitude response of the cascaded baseband generator 10 and RF up-converter 20 at $\omega_m$ and $\omega_c$ is given by:

$$A(\omega_m, \omega_c) = |G_{BBl}(\omega_m)||G_{UC}(\omega_m, \omega_c)|$$

$$\frac{|V_{Det}(\omega_m, \omega_c)|}{K_{Det} M^2} = \{|A(\omega_m, \omega_c)|^2 +$$

$$K_{BBm}^2 K_{UCm}^2 \Delta\omega^4 - [|G_{BB}(\omega_m)|^2 K_{UCm}^2 + |G_{UC}(\omega_m, \omega_c)|^2 K_{BBm}^2]\Delta\omega^2\}$$

Since the dependence on $\Delta\omega$ is small (reasonably flat response over $\Delta\omega$), then the square root may be approximated by $$\sqrt{1+x} = 1 + \frac{x}{2}$$

$$\sqrt{\frac{|V_{Det}(\omega_m, \omega_c)|}{K_{Det} M^2}} =$$

$$|A(\omega_m, \omega_c)|\left\{1 + \frac{K_{BBm}^2 K_{UCm}^2 \Delta\omega^4 - [|G_{BB}(\omega_m)|^2 K_{UCm}^2 + |G_{UC}(\omega_m, \omega_c)|^2 K_{BBm}^2]\Delta\omega^2}{2|A(\omega_m, \omega_c)|^2}\right\}$$

$$\sqrt{\frac{|V_{Det}(\omega_m, \omega_c)|}{K_{Det} M^2}} = |A(\omega_m, \omega_c)|\{1 + A_{Error}\}$$

where

-continued $$A_{Error} = \frac{K_{BBm}^2 K_{UCm}^2 \Delta\omega^4 - [|G_{BB}(\omega_m)|^2 K_{UCm}^2 + |G_{UC}(\omega_m, \omega_c)|^2 K_{BBm}^2]\Delta\omega^2}{2|A(\omega_m, \omega_c)|^2}$$

Where $\Delta\omega$ is chosen so that the baseband correction filter 12 and the RF filter 18 each vary less than 0.5 dB over the frequency separation between the two tones, then:

$$K_{BBm}\Delta\omega \leq 0.0592|A(\omega_m,\omega_c)|$$

$$K_{UCm}\Delta\omega \leq 0.0592|A(\omega_m,\omega_c)|$$

Taking the equality as an upper bound and assuming approximately unity for $|A(\omega_m,\omega_c)|$, then:

$$\pm A_{error} = \pm[0.0000123 \mp [0.0035+0.0035]]$$

$$\pm A_{error} = \pm 0.06 \text{ dB}$$

With the phase of the detected beat note at the center frequency ($\omega_m=0$) as the reference, the phase difference from the center frequency at any point phase is given by:

$$\Delta\emptyset(\omega_m,\omega_c) = \emptyset_{BB}(\omega_{m2}) - \emptyset_{BB}(\omega_{m1}) + \emptyset_{UC}(\omega_{m2},\omega_c) - \emptyset_{UC}(\omega_{m1},\omega_c)$$

$$\Delta\emptyset(\omega_m,\omega_c) = \emptyset_{BB}(\omega_m) + K_{BB\emptyset}\Delta\omega - \emptyset_{BB}(\omega_m) + K_{BB\emptyset}\Delta\omega + \emptyset_{UC}(\omega_m) + K_{UC\emptyset}\Delta\omega - \emptyset_{UC}(\omega_m) + K_{UC\emptyset}\Delta\omega$$

$$\Delta\emptyset(\omega_m,\omega_c) = 2K_{BB\emptyset}\Delta\omega + 2K_{UC\emptyset}\Delta\omega$$

Group delay is defined as:

$$\tau = \frac{-d\emptyset}{d\omega}$$

$$\tau(\omega_m, \omega_c) = \frac{-d\emptyset}{d\omega} \cong -K_{BB\emptyset} - K_{UC\emptyset} = -\frac{\Delta\emptyset(\omega_m,\omega_c)}{2\Delta\omega}$$

Phase is computed by integrating the group delay response over the frequencies of interest.

$$\emptyset(\omega_m, \omega_c) = -\int_{\omega_{start}}^{\omega_{sstop}} \tau(\omega_m, \omega_c)d\omega + \emptyset_0$$

For the case where is stepped in increments of $\omega_{step}$, the integral becomes a summation $$\emptyset(\omega_m, \omega_c) = -\sum_{m=-M}^{M} \tau(\omega_m, \omega_c)\omega_{step} + \emptyset_0$$

$$= \sum_{m=-M}^{M} \frac{\Delta\emptyset(\omega_m, \omega_c)}{2\Delta\omega}\omega_{step} + \emptyset_0$$

Figure 2:
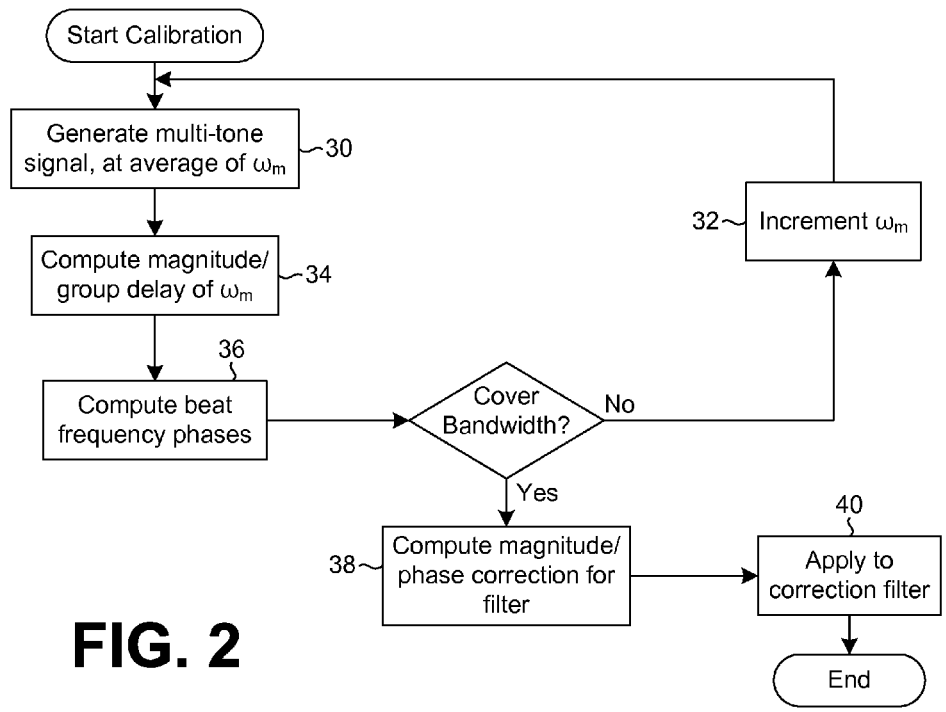
FIG. 2 is a flow diagram view of a method for calibrating amplitude flatness and phase linearity across an RF wideband frequency source according to the present invention.

In summary the calibration procedure for the two-tone calibration signal, as shown in FIG. 2, is as follows:
1. Generate two sinusoidal tones of equal amplitude whose average frequency is $\omega_m$, and whose separation is $2\Delta\omega$. (Step 30) These tones are passed through up-converter 20 to be calibrated. $\Delta\omega$ is chosen such that the amplitude response is less then 0.5 dB between $\omega_1$ and $\omega_2$.
2. Step $\omega_m$ across the frequency bandwidth of interest with a step size small enough to adequately capture the granularity of the frequency response being measured. (Step 32) Compute the magnitude and group delay for each value of $\omega_m$. (Step 34)
3. Compute the phase response for each value of $\Delta\omega$. (Step 36)
4. Compute the magnitude and phase of the correction filter 12 from the sampled amplitude and phase points. (Step 38)
5. Apply FIR filter coefficients to the correction filter 12 to produce the frequency response: (Step 40)

$$|G_{Corr}(\omega_m, \omega_c)| = \frac{1}{A(\omega_m, \omega_c)}$$

$$= \frac{1}{\sqrt{\frac{|V_{Dsi}(\omega_m, \omega_c)|}{K_{Dec}M^2}}}$$

$$= M\sqrt{\frac{K_{Dst}}{|V_{Dst}(\omega_m, \omega_t)|}}$$

$$\emptyset_{Corr}(\omega_m, \omega_c) = -\emptyset(\omega_m, \omega_c) = -\sum_{m=-M}^{M} \frac{\Delta\emptyset(\omega_m, \omega_c)}{2\Delta\omega}\omega_{step} + \emptyset_0$$

Figure 3:
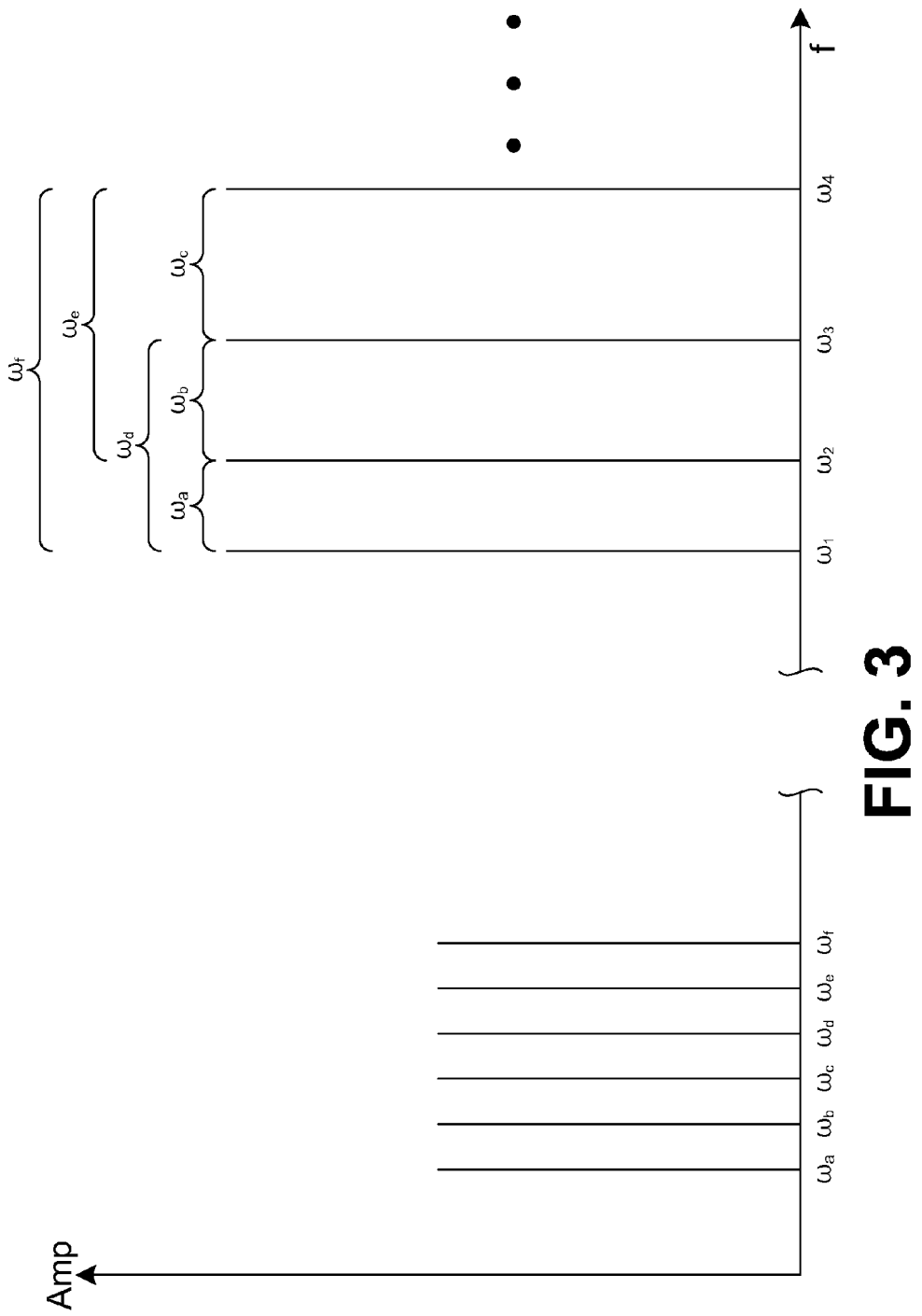
FIG. 3 is a graphic diagram view for the calibrating method according to the present invention.

Referring now to FIG. 3, a frequency spectrum for a multitone implementation is shown. The RF frequencies, $\omega_1$ and $\omega_2$, represent the pair of tones implementation described above, which produces a beat frequency, $\omega_\alpha$, output from the diode detector 22. Other frequencies, $\omega_3, \omega_4, \ldots$, may be output from the baseband signal generator 10, which frequencies are non-harmonic with respect to each other. Using multiple tones, rather than just a pair of tones, helps to speed up basic operation since a wider span of frequencies is covered for each step across the desired wideband frequency range. The amplitudes of each tone are measured, as well as the phase for each beat frequency between the multiple tones. From the measured amplitudes and phases, the FIR filter coefficients are calculated.

Consider a set of n sinusoidal tones that are passed through the diode detector 22, similar to the one described above with reference to the pair of tones implementation. The output from the diode detector 22 contains frequency components, i.e., beat frequencies, between the respective input frequencies, as shown in FIG. 3. If the tones are chosen so that the differences between their respective frequencies are not harmonically related, then the output from the diode detector 22 contains n(n−1)/2 unique individual beat frequencies. These beat frequencies are processed using Fourier techniques, as described above with respect to the two-tone implementation, allowing the phase and magnitude over a wider band of frequencies to be determined at each step increment, i.e., the frequency step increments are larger.

Thus the present invention provides amplitude flatness and phase linearity calibration to an RF source using a square law diode detector where the RF source provides at least a pair of tones for the calibration process.

What is claimed is:

1. A method of calibrating an RF signal source, the RF source being of the type having a baseband signal generator, a correction filter and an up-converter coupled in series, for amplitude flatness and phase linearity of an RF signal output comprising the steps of:
generating from the baseband signal generator a plurality of equal amplitude frequency tones having a specified average frequency and specified frequency separations between the tones such that the equal amplitude frequency tones are non-harmonic with respect to each other;
computing from the RF output signal a magnitude and group delay for the specified average frequency;
computing a phase response for the specified frequency separations;
stepping the specified average frequency from the baseband signal generator across a specified frequency bandwidth and repeating the generating and computing steps at each specified average frequency; and
calculating filter coefficients for the correction filter from the magnitude and phase responses so that the RF signal output has amplitude flatness and phase linearity across the specified frequency bandwidth.

2. The method as recited in claim 1 wherein the plurality of equal amplitude frequency tones comprise a pair of equal amplitude frequency tones having a specified frequency separation.

3. A system for calibrating a radio frequency (RF) source, comprising:
a correction filter;
a baseband signal generator configured to provide for calibration a plurality of equal amplitude frequency tones having a specified average frequency and specified frequency separations between the tones, wherein the equal amplitude frequency tones are non-harmonic with respect to each other, the tones being input to the correction filter;
an up converter coupled to the output of the correction filter; to produce an output RF signal; and
an amplitude flatness and phase linearity calibrator, including:
a square law diode detector coupled to receive the output RF signal from the up-converter to produce a detected output signal; and
means for processing the detected output signal to produce calibration coefficients for the correction filter.

4. The system as recited in claim 3 wherein the baseband generator provides for calibration a pair of equal amplitude frequency tones having a specified frequency separation, the tones being input to the correction filter.

5. The system as recited in claim 3 wherein the processing means comprises:
means for converting the detected output signal to digital samples; and
a processor having the digital samples as an input in order to compute from the digital samples a magnitude and group delay for the specified average frequency and a phase response for the specified frequency separations from which the calibration coefficients are calculated so that the RF signal output has amplitude flatness and phase linearity across the frequency bandwidth represented by the tones.

6. The system as recited in claim 5 wherein the baseband signal generator steps the specified average frequency across a desired RF frequency bandwidth for the RF source so that the processor provides calibration coefficients for the correction filter at each step so that the RF signal output has amplitude flatness and phase linearity across the desired RF frequency bandwidth.

* * * * *